United States Patent
Persoons et al.

(10) Patent No.: US 10,855,848 B2
(45) Date of Patent: Dec. 1, 2020

(54) NETWORK APPARATUS COMPRISING A BASE STATION AND A DOCKING STATION, AND RESPECTIVE BASE STATION AND DOCKING STATION

(71) Applicant: THOMSON Licensing, Issy-les-Moulineaux (FR)

(72) Inventors: Bart Persoons, Edegem (BE); Daniel Monsieux, Vilvoorde (BE)

(73) Assignee: InterDigital CE Patent Holdings

( * ) Notice: Subject to any disclaimer, the term of this patent is extended or adjusted under 35 U.S.C. 154(b) by 128 days.

(21) Appl. No.: 16/060,450

(22) PCT Filed: Nov. 22, 2016

(86) PCT No.: PCT/EP2016/078418
§ 371 (c)(1),
(2) Date: Jun. 8, 2018

(87) PCT Pub. No.: WO2017/097580
PCT Pub. Date: Jun. 15, 2017

(65) Prior Publication Data
US 2019/0028594 A1    Jan. 24, 2019

(30) Foreign Application Priority Data
Dec. 8, 2015 (EP) ...................... 15306958

(51) Int. Cl.
*G06F 13/38* (2006.01)
*H04M 7/00* (2006.01)
(Continued)

(52) U.S. Cl.
CPC .......... *H04M 7/0069* (2013.01); *G06F 1/266* (2013.01); *H04W 84/105* (2013.01)

(58) Field of Classification Search
CPC .................................................. G06F 13/382
See application file for complete search history.

(56) References Cited

U.S. PATENT DOCUMENTS 4,890,210 A   12/1989  Myers
6,055,167 A   4/2000  Shamkovich et al.
(Continued)

FOREIGN PATENT DOCUMENTS

CN   102056236 A   5/2011
CN   102802060     11/2012
(Continued)

OTHER PUBLICATIONS

Anonymous, "StarTech PCI Express Expansion Box", http://www.amazon.de/StarTech-Express-Expansion-Erweiterungsgeh%C3%A4use-E . . . /, Dec. 9, 2015, pp. 1-3.
(Continued)

*Primary Examiner* — Albert Wang
(74) *Attorney, Agent, or Firm* — Volpe Koenig

(57) ABSTRACT

A network apparatus (1) including —a base station (10) having a first interface (12); —a docking station (20) connectable with the base station (10) and having a second interface (22); and —at least one transmission module of a plurality of interchangeable transmission modules (13a, 13b) configured to be connected to the base station (10) or to the docking station (20), wherein the transmission modules (13a, 13b) have network interfaces compatible with both the first interface (12) and the second interface (22).

15 Claims, 2 Drawing Sheets

(51) Int. Cl.
*H04W 84/10* (2009.01)
*G06F 1/26* (2006.01)

(56) References Cited

U.S. PATENT DOCUMENTS

| | | | |
|---|---|---|---|
| 7,382,786 | B2 | 6/2008 | Chen et al. |
| 7,688,841 | B2 | 3/2010 | Binder |
| 7,746,629 | B2 | 6/2010 | Assouad et al. |
| 9,191,230 | B2 | 11/2015 | Madonna et al. |
| 2003/0219002 | A1* | 11/2003 | Kishida ............... H04W 16/16 370/338 |
| 2003/0233667 | A1 | 12/2003 | Umipig et al. |
| 2004/0090984 | A1* | 5/2004 | Saint-Hilaire ...... H04L 12/4633 370/463 |
| 2006/0187954 | A1* | 8/2006 | Braschi ............... H04M 7/0069 370/463 |

FOREIGN PATENT DOCUMENTS

| | | |
|---|---|---|
| CN | 203167288 | 8/2013 |
| EP | 1087588 A2 | 3/2001 |
| EP | 1547314 | 5/2013 |
| WO | 199628878 A1 | 9/1996 |
| WO | WO2000011840 | 3/2000 |

OTHER PUBLICATIONS

IEEE 802.11-2012, IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

IEEE 802.11ac-2013, IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE 802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE 802.11ad-2012 (Dec. 2012).

wikipedia.org, "Docket Station," available at https://web.archive.org/web/20151002215204/https://en.wikipedia.org/wiki/Docking_station (Oct. 2, 2015).

* cited by examiner

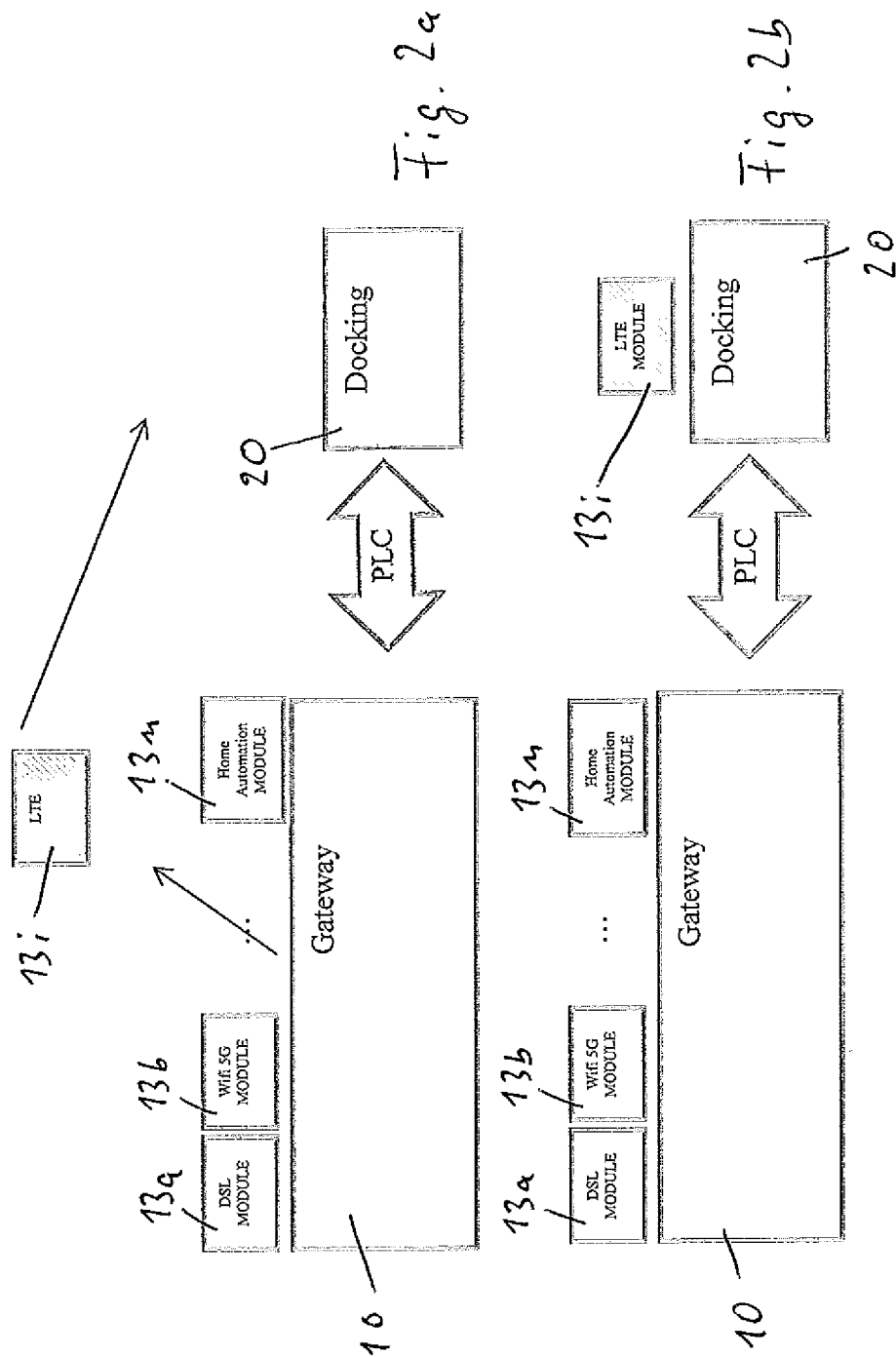

NETWORK APPARATUS COMPRISING A BASE STATION AND A DOCKING STATION, AND RESPECTIVE BASE STATION AND DOCKING STATION

This application claims the benefit of International Application PCT/EP16/078418, under 35 U.S.C. § 365, filed on Nov. 22, 2016, which was published in accordance with Article 21(2) on Jun. 15, 2017, in English, and which claims the benefit of European Patent Application No. 15306958.8 filed on Dec. 8, 2015.

TECHNICAL FIELD

The disclosure relates to the field of access gateways being coupled via a digital subscriber line to a service provider delivering broadband services to a customer.

BACKGROUND

Access gateways are widely used to connect devices in a home or an enterprise to the Internet or any other wide area network (WAN). Access gateways use in particular digital subscriber line (DSL) technology that enables a high data rate transmission over copper lines or optical lines. During the years, several DSL standards have been established differing in data rates and in range, for example ADSL, VDSL and G.Fast. Also, optical transmission for Internet services is well known, for example a Gigabit Passive Optical Network (GPON) technology using fiber-to-the-home (FTTH) and fiber-to-the premises (FTTP).

Access gateways including wireless technology have a key role in today's home and professional environments. A mechanism for connecting wireless devices to a local area network (LAN) is called Wi-Fi, which is a brand name of a Wi-Fi Alliance for devices using the IEEE 802.11 family of standards for wireless data transmission. An access gateway is for example a residential gateway, which has a central position within a wireless local area network (WLAN) of a customer.

In the meanwhile, a large variety of access gateways exist, having a multitude of functions, for example access gateways being configured to use in addition or alternatively wireless digital subscriber connections according to a Long Term Evolution (LTE) standard, very high data rate wireless communications according to an IEEE 802.11ac standard and in the future of an IEEE 802.11ad standard, and/or fast Ethernet or Gigabit Ethernet connections.

It would be advantageous for a customer to have an access gateway which could be upgraded by himself according to growing requirements of his network. By upgrading, it is meant adding and/or modifying functionalities of the access gateway.

WO 00/11840 discloses an access gateway comprising interfaces, for example common PCI slots, in which proper daughter boards are inserted according to requirements of a customer.

EP-A-1 547 314 discloses an incremental modular home gateway comprising several separate gateway modules for providing connections with a multitude of external signal sources.

SUMMARY

In one aspect of the disclosure, a network apparatus includes:
a base station having a first interface;
a docking station connectable with the base station and having a second interface; and
at least one transmission module of a plurality of interchangeable transmission modules configured to be connected to the base station or to the docking station, wherein the transmission modules have network interfaces compatible with both the first interface and the second interface.

A docking station is used here to bring an extension of functions to the base station, for instance in a similar way as a laptop that can be plugged into a docking station to provide, for instance, more USB ports (see for example https://en.wikipedia.org/wiki/Docking station).

Advantageously, the network apparatus has a fixed-size enclosure.

The transmission modules advantageously include wireless transmission modules.

In a first embodiment, the base station is provisioned with a wireless transmission module operating in a lower frequency band and the docking station is provisioned with a wireless transmission module operating in a higher frequency band.

In a second embodiment, the base station is provisioned with a wireless transmission module operating in a higher frequency band and the docking station is provisioned with a wireless transmission module operating in a lower frequency band.

In another preferred embodiment, the docking station is provisioned with at least one of an LTE transmission module or a Wi-Fi module.

In another aspect of the disclosure, the base station is configured to be coupled via a wired transmission with the docking station.

Advantageously, the wired transmission is operating in accordance with an Ethernet standard or a powerline communications standard.

According to an embodiment, the network apparatus is configured to discover a connected transmission module.

Preferably, the network apparatus is configured to implement a discovery mechanism in accordance with a Universal Plug and Play, UPnP, standard.

By this discovery mechanism, the base station is capable to recognize that a transmission module is connected to the second interface and can initialize the operation of this connected transmission module.

Preferably, the first and second interfaces are interfaces in accordance with a Peripheral Component Interconnect Express, PCIe, or an Universal Serial Bus, USB, standard.

Advantageously, the network apparatus is configured to regulate a power distribution to the transmission module.

Advantageously, the base station is an access gateway.

According to another aspect of the disclosure, a base station having a first interface is provided, the base station being configured to be included in a network apparatus also including a docking station connectable with the base station and having a second interface and at least one transmission module of a plurality of interchangeable transmission modules configured to be connected to the base station or to the docking station, wherein the transmission modules have network interfaces compatible with both the first interface and the second interface.

According to another aspect of the disclosure, a docking station having a second interface is provided, the docking station being configured to be included in a network apparatus also including a base station having a first interface and at least one transmission module of a plurality of interchangeable transmission modules configured to be connected to the base station or to the docking station, wherein said docking station is connectable with the base station and the transmission modules have network interfaces compatible with both the first interface and the second interface.

BRIEF DESCRIPTION OF THE DRAWINGS

Preferred embodiments of the disclosure are explained in more detail below by way of example with reference to schematic drawings, which show.

DETAILED DESCRIPTION OF PREFERRED EMBODIMENTS

Figure 1:
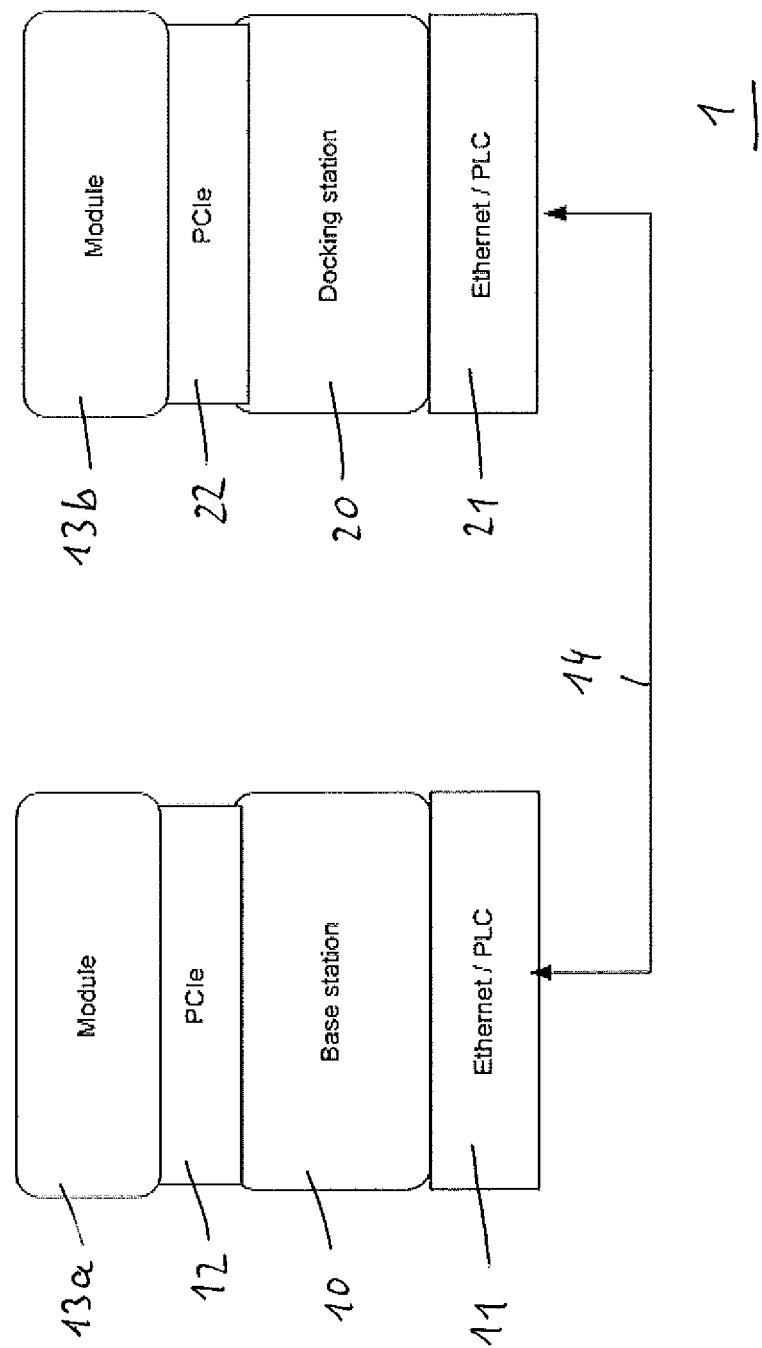
FIG. 1 a network apparatus comprising a base station and a docking station according to an embodiment of the invention, and FIG. 2 a network apparatus comprising a docking station and a base station being configured to accommodate a multitude of transmission modules according to an embodiment of the invention.

It should be understood that the elements shown in the figures may be implemented in various forms of hardware, software or combinations thereof. Preferably, these elements are implemented in a combination of hardware and software on one or more appropriately programmed general-purpose devices, which may include a processor, a memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for instructional purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In FIG. 1, a network apparatus 1 is depicted in a simplified manner comprising a base station 10 and a docking station 20. The network apparatus 1 is for example configured to operate a home network or an enterprise network. The base station 10 is in a preferred embodiment a residential gateway providing broadband services for a customer. The base station 10 comprises a network port 11 for providing a data transmission 14 with a network port 21 of the docking station 20. The data transmission between the network ports 11, 21 is provided in particular via a wired connection, for example by using an Ethernet protocol or a power line communications (PLC) protocol.

The base station 10 has a first interface 12 comprising several transmission ports, for example one, two or more, to one of which a transmission module 13a is connected. The docking station 20 comprises a second interface 22 with one or more transmission ports, to which in this embodiment a transmission module 13b is connected. The network apparatus 1 operates therefore as if the base station 10 and the docking station 20 are one system to provide a home gateway functionality to a home user.

The transmission modules 13a, 13b have interfaces compatible with both the interfaces 12, 22 so that they are interchangeable, meaning that the transmission module 13a may also be connected to the second interface 22 while the transmission module 13b may also be connected to the first interface 12. In other terms, the transmission modules 13a, 13b can be exchanged by the user.

The transmission modules 13a, 13b are for example wireless transmission modules, e.g. a Wi-Fi module operating in accordance with an IEEE 802.11n, 802.11ac or 802.11ad standard, an LTE module or a home automation module for operating a home automation network. The first and second interfaces 12, 22 are for example interfaces in accordance with a Peripheral Component Interconnect Express Bus (PCIe) or a Universal Serial Bus (USB) standard. The base station 10 may be provisioned in particular as an access gateway, e.g. a residential gateway, being configured to operate a home network also without the docking station 20.

The use of PCIe and USB is advantageous as it allows for higher data throughput of more than 1 Gbps when associated with modern modules using MIMO Wi-Fi, LTE, G. Fast, etc.

Also, the use of such interfaces allows the regulation of power distribution to the modules.

Preferably, the modules 13*a*, 13*b* cannot be connected together directly. They are endpoints for the network apparatus 1. The preferred embodiment does not consider the possibility of stacking another transmission module to either the module 13*a* or the module 13*b*.

Advantageously, the network apparatus 1 has a fixed-size enclosure, which allows a dedicated housing design that is suitable in a home environment.

In an embodiment, illustrated in FIGS. 2*a*, 2*b*, the base station 10 comprises an interface including n ports for accommodating each a transmission module 13*i*, i=a–n. The transmission modules include in this embodiment a DSL module 13*a*, an IEEE 802.11ac (Wi-Fi) module 13*b*, an LTE module 13*i* and a home automation module 13*n*. Also, a voice module may be included.

Thus, according to this embodiment of the invention, the number of transmission modules that may be connected is limited to the total number of ports on the base station 10 and on the docking station 20, for instance n+1 maximum in the example of FIGS. 2*a*, 2*b*.

Advantageously, as the modules are interchangeable, it is possible for the user, according to his/her needs, for example when he/she needs a faster connection, to change the WAN connection on the base station 10 from DSL to LTE by replacing the DSL module 13*a* by the LTE module 13*i*.

The base station 10 is located for example on a ground floor of a home, the docking station 20 on the first floor of the home, and the communication between the base station 10 and the docking station 20 is provided via PLC. Depending on the signal quality, an LTE reception may be better on the ground floor or on the first floor in the home. For cases in which the reception is better in the first floor, the LTE module 13*i* can be easily moved from the base station 10 to the docking station 20.

Discovery of the LTE module 13*i* can be provided for example by using a universal plug and play protocol, so that the base station 10 is immediately informed when the LTE module 13*i* is placed in the network interface of the docking station 20. In particular, the docking station 20 detects the module 13*i*, identifies its functionality through the PCIe interface and relays this information to the base station 10 via the PLC connection. Configuration can be done via the base station 10, or, alternatively, configuration parameters, for instance user credentials, can be stored in a non-volatile memory of the module 13*i*.

Thus, there's no need for the user to re-enter the configuration parameters when he decides to change his working environment, for example his home office from one room to another by moving a transmission module (for example LTE or Wi-Fi module) from the base station 10 to the docking station 20. Rather, the discovery mechanism of the USB protocol may be used for instance, allowing the configuration parameters to be read from the non-volatile memory embedded in the transmission module 13*i*. The configuration parameters may include user credential, information about previous use, network configuration (wired and/or wireless), etc.

In another embodiment, the docking station 20 is placed in a living room of the home, in a range of a television set of an end-user, and a high data rate IEEE 802.11 transmission module 13*b* is used and placed on the docking station 20. A high data rate IEEE 802.11 standard, e.g. an IEEE 802.11ac or 802.11ad standard, allows to transmit data with data rates being sufficient for providing an Ultra-high-definition television (UHDTV) transmission from the Internet via the base station 10, the docking station 20 and the transmission module 13*b* to the television set. In another embodiment, the base station 10 includes a DSL module, which may be replaced by a user with an optical transmission module, for example a Gigabit Passive Optical Network (GPON) module, to upgrade an existing connection to a higher data rate for an improved Internet connectivity.

The base station 10 and the docking station 20 of the network apparatus 1 may be delivered by a service provider or a manufacturer as a single product or as separate devices, so that an end-user can first buy the base station 10 and use the base station 10 as an access gateway, and in a further step, he can buy, in addition, the docking station 20 any time later to upgrade his home network. Also, the transmission modules 13*i* can be provided separately, so that the customer can adapt his home network to future requirements.

When using PLC for the connection between the base station 10 and the docking station 20, the network apparatus 1 can be used in a very flexible manner: For example, when the user wants to move his laptop or tablet PC to his garden, he can extend the wireless coverage of his home network by simply plugging his docking station 20 to an external power plug of the garden. In another example, the user can choose to move the Wi-Fi module 13*b* from the base station 10 to the docking station 20, or to add a second Wi-Fi module to the network apparatus 1, the base station 10 or the docking station 20.

Both base station 10 and docking station 20 have a host processor for operation and in order to bridge the connection between the base station 10 and the docking station 20. Each of the transmission modules 13*i* include a chipset with a core functionality in accordance with one of its transmission standards. The transmission modules are advantageously wireless transmission modules, but also transmission modules 13*i* providing Ethernet connectivity can be used.

Also, other embodiments may be utilized by one skilled in the art without departing from the scope of the present disclosure. The network apparatus allows in particular to extend and to improve Local Area Network (LAN) as well as Wide Area Network (WAN) functionality.

The invention claimed is:

1. A network apparatus including
   a base station having a first interface and configured to provide network access gateway functionality;
   a docking station connectable with the base station and having a second interface, wherein the docking station is configured to extend the network access gateway functionality of the base station; and
   at least one transmission module of a plurality of interchangeable transmission modules configured to be connected to the base station or to the docking station, wherein the plurality of interchangeable transmission modules have network interfaces compatible with both the first interface and the second interface.

2. The network apparatus of claim 1, wherein the network apparatus has a fixed-size enclosure.

3. The network apparatus of claim 1, wherein the transmission modules include wireless transmission modules.

4. The network apparatus of claim 3, wherein the base station is provisioned with a wireless transmission module operating in a lower frequency band and the docking station is provisioned with a wireless transmission module operating in a higher frequency band.

5. The network apparatus of claim 3, wherein the base station is provisioned with a wireless transmission module operating in a higher frequency band and the docking station is provisioned with a wireless transmission module operating in a lower frequency band.

6. The network apparatus of claim 1, wherein the network apparatus is configured to discover a connected transmission module.

7. The network apparatus of claim 6, wherein the network apparatus is configured to implement a discovery mechanism in accordance with a Universal Plug and Play, UPnP, standard.

8. The network apparatus of claim 1, wherein the first and second interfaces are interfaces in accordance with a Peripheral Component Interconnect Express, PCie, or an Universal Serial Bus, USB, standard.

9. The network apparatus of claim 1, wherein the network apparatus is configured to regulate a power distribution to the transmission module.

10. A base station having a first interface and configured to provide network access gateway functionality, the base station being configured to be included in a network apparatus also including a docking station connectable with the base station and having a second interface and at least one transmission module of a plurality of interchangeable transmission modules configured to be connected to the base station or to the docking station, wherein the plurality of interchangeable transmission modules have network interfaces compatible with both the first interface and the second interface, and wherein the docking station is configured to extend the network access gateway functionality of the base station.

11. The base station of claim 10, wherein the base station is configured to be coupled via a wired transmission with the docking station.

12. The base station of claim 11, wherein the wired transmission is operating in accordance with an Ethernet standard or a powerline communications standard.

13. The base station of claim 10, wherein the base station is an access gateway.

14. A docking station having a second interface, the docking station being configured to be included in a network apparatus also including a base station having a first interface, configured to provide network access gateway functionality, and at least one transmission module of a plurality of interchangeable transmission modules configured to be connected to the base station or to the docking station, wherein said docking station is connectable with the base station and the transmission modules have network interfaces compatible with both the first interface and the second interface, and wherein the docking station is configured to extend the network access gateway functionality of the base station.

15. The docking station of claim 14, wherein the docking station is provisioned with at least one of an LTE transmission module or a Wi-Fi module.

* * * * *